United States Patent [19]

Crissman et al.

[11] 4,059,498

[45] Nov. 22, 1977

[54] RADIAL FLOW ELECTROSTATIC FILTER

[75] Inventors: James H. Crissman, Kiskiminetas Township; G. Ray Fritsche, Bradford Woods; Frederick B. Hamel, Allison Park; Lloyd W. Hilty, Apollo, all of Pa.

[73] Assignee: Gulf Research & Development Company, Pittsburgh, Pa.

[21] Appl. No.: 729,956

[22] Filed: Oct. 6, 1976

[51] Int. Cl.² .............................................. B03C 5/00
[52] U.S. Cl. ..................................... 204/188; 204/302
[58] Field of Search .............................. 204/302–308, 204/186–191

[56] References Cited

U.S. PATENT DOCUMENTS

| | | | |
|---|---|---|---|
| 3,567,619 | 3/1971 | Brown | 204/302 |
| 3,799,856 | 3/1974 | Franse | 204/188 |
| 3,891,528 | 6/1975 | Griswold | 204/302 |
| 3,928,158 | 12/1975 | Fritsche | 204/302 |

*Primary Examiner*—T. M. Tufariello

[57] ABSTRACT

A filter for separating finely divided solid particles that may be electrically conducting from electrically non-conducting liquids has means for directing the liquid to be filtered in a radial flow pattern through a filter bed of glass beads to which a high-voltage gradient is applied. A central tubular electrode that serves as a conduit for the liquid extends longitudinally through the filter bed within a concentric cylindrical outer electrode spaced between the central electrode and the casing wall of the filter. After filtering until the electrical current through the filter bed exceeds a predetermined maximum, the voltage gradient is discontinued and the filter back-flushed by flowing liquid upwardly through the filter at a rate that expands the filter and causes movement of the beads relative to one another and to the cylindrical outer electrode to remove deposited solids from the beads and from the electrode. The radial flow pattern allows a greatly increased flow rate as compared to longitudinal flow with a highly efficient separation of the solid particles.

17 Claims, 3 Drawing Figures

RADIAL FLOW ELECTROSTATIC FILTER

BACKGROUND OF THE INVENTION

1. Field of the Invention

This invention relates to the removal of finely divided particles from liquids and more particularly to an electrostatic apparatus for separating finely divided particles from nonconducting liquids.

2. Description of the Prior Art

Many oils contain excessive amounts of finely divided suspended solid particles that lower the quality of the oils or interfere with their further processing. The particles may be suspended in oils such as crude oils as those oils are produced from wells or may be introduced into the oils during processing. For example, particles of iron sulfide or iron oxide may be introduced into hydrocarbon oils in certain processing steps in petroleum refineries. If the oils are to be further processed by passing them through fixed beds of catalyst at elevated temperatures and pressures, the solid particles may deposit on the catalyst, particularly at the inlet end of the catalyst beds and eventually plug the catalyst beds. In the hydrogenation of vegetable oils, finely divided particles of catalyst are suspended in the oil during hydrogenation and must be removed from the hydrogenated oil to give a product of acceptable clarity.

Conventional filtering of liquids in which the liquid is made to pass through a permeable medium or screens is effective in removing from the liquid solid particles having a nominal diameter larger than about 25 microns. The solid particles of iron oxide and iron sulfide that become suspended in petroleum fractions in some petroleum refining operations are less than 5 microns in diameter and the majority of the particles are less than one micron. Mechanical-type filters such as papers, cloths, screens or stacked discs are not effective in removing such particles from the liquid. If the openings in the filter medium are reduced in size to prevent passage of the solid particles, the filter medium quickly becomes plugged.

In U.S. Pat. No. 3,324,026 of Waterman et al. and U.S. Pat. No. 3,394,067 of Shirley, electrofilters are described which include a solid urethane foam filter element between the electrodes to aid in separation of the solids from the liquid being filtered. Such foams cannot be used in the filtration of hot refinery streams. Moreover, backflushing of the separated solids from the filter element is not possible; consequently, it is necessary to replace the filter element each time it becomes loaded with sufficient solids to cause excessive current through the filter.

U.S. Pat. No. 2,534,907 of Ham et al and U.S. Pat. No. 2,573,967 of Hamlin describe electrostatic filters in which the liquid to be filtered is made to pass between electrodes in a bed of a filter medium. Ham et al use a particulate bed of an organic ion-exchange resin as the filter medium. Hamlin prefers a loosely packed maze of fibrous material such as glass wool as a filter medium but suggests that a granular non-conductive material can be used. Neither of the patents describes an electrostatic filter or precipitator in which the particulate bed can be cleaned effectively by backflushing to recondition the bed for another filtration cycle. Hamlin suggests partially cleaning the filter medium by disconnecting the source of electric potential and circulating a liquid through the filter bed in the same direction as during the filtration operation.

U.S. Pat. No. 3,928,158 of Fritsche et al. describes an electrostatic filter in which an electrostatic gradient is imposed across a bed that consists of substantially spherical, nondeformable, smooth-surfaced beads of a ceramic material of high electrical resistivity. Glass beads are preferred. A liquid is caused to flow through interelectrode space within the bed while the electrical gradient is imposed across the bed. Solid particles are deposited in the filter bed principally at the points of contact of the substantially spherical particles. The filter bed can be repeatedly and readily reconditioned for further use by backflushing to remove the deposited solids. U.S. Pat. Nos. 3,799,855; 3,799,856 and 3,799,857 of Franse describe different applications of a filter of the type described in U.S. Pat. No. 3,928,158 of Fritsche et al.

U.S. Pat. No. 3,252,885 of Griswold and U.S. Pat. No. 2,925,372 of Keehn describe electrostatic filters in which the liquid being filtered flows radially through the filter medium. In the filters described in both of those patents, the radial flow is used to increase the area of the filter medium on which deposition of solids can occur. Neither of the patents discloses a filtering structure which can be cleaned for further use by backflushing.

SUMMARY OF THE INVENTION

This invention resides in an electrostatic separator for the removal of finely divided particles, which may be electrically conductive, from a liquid of high electrical resistivity. The separator includes a particulate filter bed of substantially spherical, nondeformable, smooth-surface particles of high electrical resistivity mounted within a casing provided with an inlet and an outlet. A central tubular electrode perforated through the interval of the filter bed extends downwardly through the filter bed. An outer vertical perforated cylindrical electrode that is spaced from the casing wall is concentric with the central electrode. The electrodes are suitably connected to a source of power to maintain a voltage gradient between them. Conduit means direct flow of the liquid to be filtered radially through the electrodes and filter bed while the voltage gradient is maintained between the electrodes. The filter bed is periodically cleaned by discontinuing the voltage gradient and flowing liquid upwardly through the filter bed while the voltage gradient is interrupted.

DESCRIPTION OF PREFERRED EMBODIMENT

Figure 1:
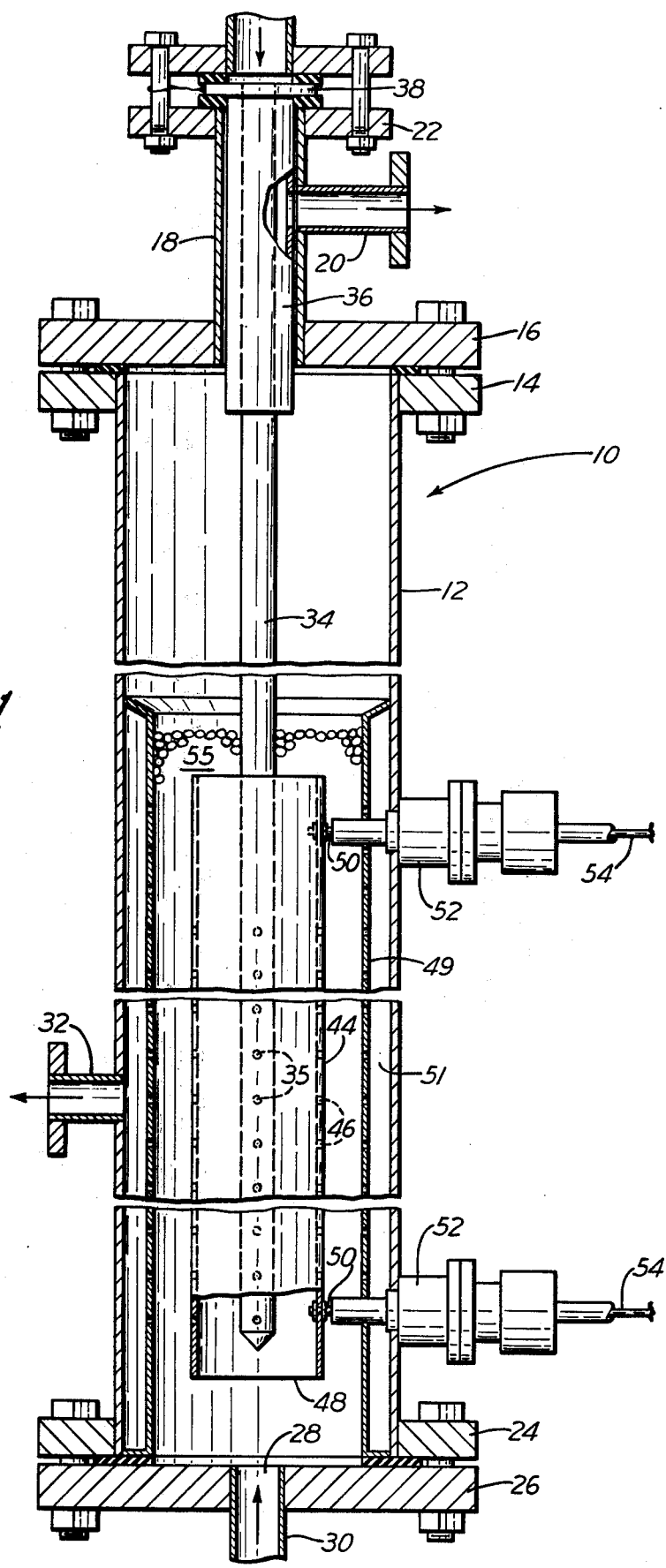
FIG. 1 is a vertical sectional view of the electrostatic separator of this invention.

Referring to FIG. 1 of the drawings, the electrostatic separator indicated generally by reference numeral 10 includes a cylindrical casing 12 having an end plate 14 at its upper end for connection to a flange 16 at the lower end of a spool 18. A backflush outlet nozzle 20 opens through the side wall of spool 18. The upper end of the spool 18 is flanged at 22 for connection to a source, not shown in FIG. 1, of liquid to be filtered. Suspended from flange 22 and extending downwardly through spool 18 and into the casing 12 is a tubular electrode 34. Electrode 34 has perforations 35 over the lower part of its length to discharge dirty liquid into the filter bed, as hereinafter described.

Casing 12 is provided with a flange 24 at its lower end for connection to a bottom plate 26 through which there is a centrally located opening 28. A backflush line 30 is connected to plate 26 for delivery of backflush liquid through opening 28, as hereinafter described. A filtered product nozzle 32 is provided in the side wall of casing 12 for delivery of the filtered product from the filter.

Figure 2:
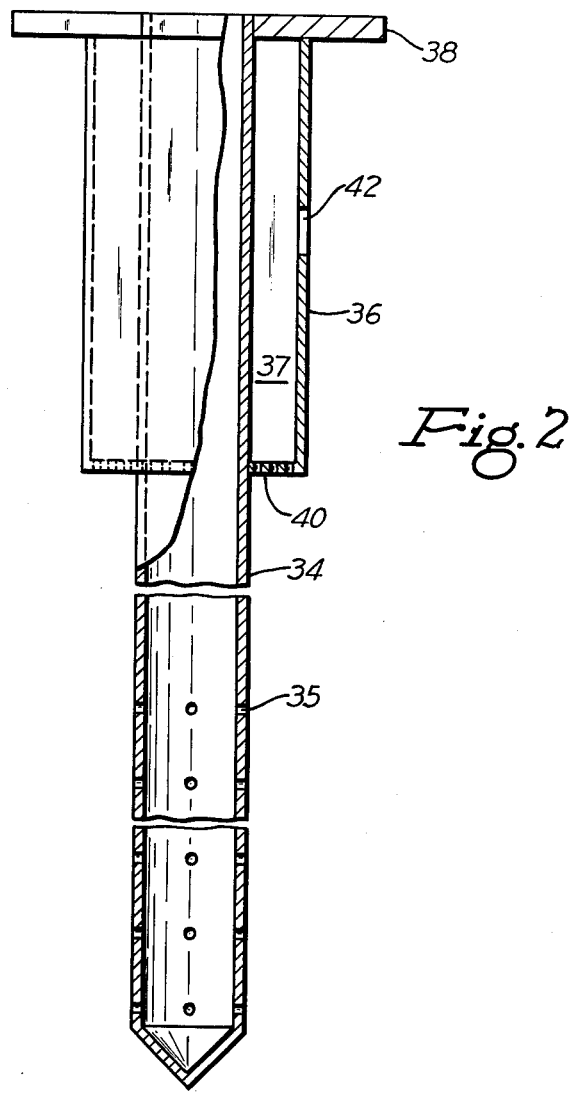
FIG. 2 is a vertical sectional view of a backflush collar for discharging backflush liquid from the separator.

Referring to FIG. 2 of the drawings, a cylindrical jacket 36 surrounding electrode 34 near its upper end encloses an annular space 37 through which backflush liquid may flow. Space 37 is closed at the upper end of the jacket by a centrally apertured plate 38 that extends outwardly beyond jacket 36 to overhang the upper surfce of flange 22 to support the electrode 34 within casing 12. A perforated base plate 40 at the lower end of annular space 37 permits entry of backflush liquid during the backflushing operation into space 37. Such backflush liquid is discharged through an outlet 42 in the side wall of the jacket in alignment with the backflush outlet nozzle 20. The outer diameter of jacket 36 is only slightly less than the internal diameter of spool 18 whereby the clearance is not large enough to allow the filter medium to pass between the jacket 36 and spool 18 during backflushing.

Concentric with and surrounding electrode 34 is a cylindrical outer electrode 44. Outer electrode 44 has perforations 46 along substantially its full length through which the liquid being filtered flows and is supported with its lower end 48 spaced above the bottom plate 26 by a pair of electrically conducting rods 50. In a preferred embodiment of this invention, a perforated cylindrical liner 49 is mounted within casing 12 between the outer electrode 44 and the wall of casing 12. Liner 49 extends from near the bottom of the casing preferably to just above the upper end of the outer electrode. The diameter of liner 49 is sufficiently smaller than the diameter of casing 12 to provide an annular space 51 between the liner 49 and casing 12 of large enough area to result in insignificant pressure drop in the filtered liquid flowing through the annular space to outlet 32 as hereinafter described. The annular space 51 is closed at top and bottom and the perforations in the liner 49 are smaller than the particles of the filter medium hereinafter described to keep the filter medium out of the annular space. Resistance to flow of filtered liquid in annular space 51 is thereby minimized.

Rods 50 are insulated from the casing 12 and liner 49 by suitable bushings 52 and are connected at their outer ends by means of insulated conductors 54 with a high-voltage, preferably direct current souce, not shown in the drawings. In a typical installation of the preferred embodiment, the casing 12 has an internal diameter of 12 inches and is 6 feet long, the outer electrode 44 is a sleeve of an electrically conductive material such as stainless steel, 6 inches in diameter and 50 inches long supported with its lower end 3 inches above the bottom plate 26, the liner 49 is 10 inches in diameter and 55–60 inches long, and the inner electrode is 2 inches in diameter and extends downwardly to approximately the level of the lower end of the outer electrode.

The filter 10 preferably contains discrete particles of the type described in U.S. Pat. No. 3,928,158 to form a particulate filter bed 55 that extends a short distance, for example about 3 inches, above the upper end of the outer electrode 44. It is necessary that there be enough room within the casing above the filter bed 55 to accommodate the expansion of the filter bed that occurs on backflushing. The preferred particles making up the filter bed are substantially spherical, smooth-surfaced, have a diameter in the range of ⅛ inch to ¼ inch, are of a nondeformable material, and have a high electrical resistivity. It is preferred that the particles have a resistivity higher than the resistivity of the oil to be filtered. Ceramics are preferred materials for the filter medium and a particularly preferred filter medium consists of glass beads characterized by a hard outer surface. Such beads are commercially available for use as propping agents to hold open fractures extending from wells into surrounding subsurface formations. They are sold under the trademark Ucar Props by Union Carbide Corporation. If the solid particles suspended in a particular liquid should not adhere strongly to the particles making up the particulate filter bed 55 and should be easily removed by backflushing, the particles of the filter bed may be sand or gravel or similar solid material of relatively low electrical conductivity and having a size of approximately 3 to 6 mesh.

Figure 3:
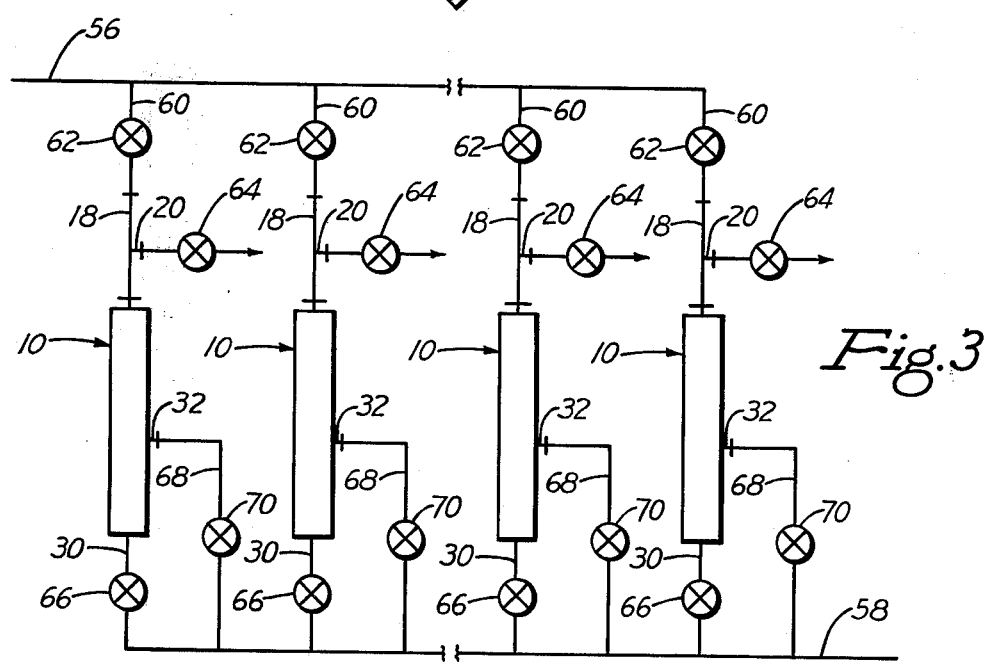
FIG. 3 illustrates a battery of electrostatic filters of this invention showing a preferred arrangement for backflushing the filters.

Referring to FIG. 3, a preferred arrangement for the filter 10 is shown with a plurality of filters connected in parallel between a feed line 56 and a filtered product discharge line 58. Four filters are shown in the drawing but any number may be used as required to give the desired filtration capacity. Inlet lines 60 having inlet valves 62 are connected between the feed line 56 and the spools 18 at the upper end of the filters. Backflush outlet nozzles 20 from the spools 18 are connected to backflush discharge valves 64.

Backflush lines 30 from the bottom of the filters are connected to the filtered product discharge line 58. Backflush valves 66 in lines 30 provide control for flow of liquid through the backflush lines. Filtered product lines 68 from the filtered product nozzles 32 to the filtered product discharge line 58 include filtered product control valves 70.

In the operation of the filter, a voltage gradient of 5 to 20 kilovolts per inch, and preferbly 7 to 12 kilovolts per inch, between the center electrode 34 and the outer electrode 44 is applied preferably by grounding the center electrode and applying a high voltage through conductor 54 to the outer electrode 44. Although it is preferred that the outer electrode be "hot", the arrangement can be changed to ground the outer electrode and apply the high voltage charge to center electrode 34. Center electrode 34 is grouned, for example, by the use of a metallic gasket between plate 38 and flange 22 of spool 18 or by electrically connecting the outer edge of the flange 39 with the casing 12 as shown in FIG. 2. The liquid to be filtered is delivered from feed line 56 through inlet lines 60, spools 18 and center electrodes 34 into the filters. The unfiltered liquid flows outwardly through perforations 35 in inner electrode 34, radially outward through the filter bed 55 and the perforations in outer electrode 44 and liner 49 to the annular space 51. As the liquid flows through the filter bed, solid particles are deposited on the beads, principally at points of contact with other beads. The liquid, designated as filtered product, flows through the annular space 51 to the filtered product nozzle 32 and is discharged through outlet 32 and filtered product lines 68 into the filtered product discharge line 58.

As separation of solid particles from the liquid continues, the amount of solids deposited in the filter bed increases. Because many of the solids have a higher electrical conductivity than the spherical beads of the filter bed and the deposition of solids at the contacts of the beads increase the effective cross sectional area of the path through which an electric current may flow, the electrical resistance of the filter bed decreases as separation continues. When one of the filters needs to be backflushed, as may be indicated by excessive current through the filter bed, the circuit from the high-voltage source to the outer electrode is opened, valves 62 and 70 of the particular filter element that is to be backflushed are closed and valves 66 and 64 of that filter are opened while other filters remain in operation. Filtered product from line 58 flows through backflush line 30 of the filter being backflushed and flows upwardly both inside and outside of the outer electrode 44 at a rate to expand the filter bed and cause movement of the particles of the filter medium relative to one another to remove deposited solids therefrom. The backflush liquid carries the solids removed from the filter bed upwardly through the perforated base plate 40, best shown in FIG. 2, and through the annular space 37 to the outlet 42.

It has been found that during operation of the filter some of the contaminating particles are deposited on the outer surface of the outer electrode 44. The provision of sufficient space between the outer surface of the electrode 44 and the liner 49 to allow substantial movement of the filter medium in that space during backflushing is effective in removing solids deposited on the outer surface of the electrode 44. After backflushing for a period adequate to clean the filter medium and the electrode 44, valves 64 and 66 of the filter being backflushed are closed and valves 62 and 70 are open. The voltage gradient is applied between the outer electrode 44 and inner electrode 34 for another filtration cycle.

The radial flow filter described herein is highly advantageous in permitting greatly increased rates of flow through the filter while effectively separating finely divided particles from hot hydrocarbon streams. Although the embodiment of the invention in which liner 49 is installed in the casing to provide a low resistance conduit through which filtered product flows from the filter bed to the outlet 32 is preferred because of the more uniform radial flow pattern that it causes, such an arrangement is not necessary to obtain the increased filter capacity that radial flow through the filter bed allows. When a filter of the type described in U.S. Pat. No. 3,928,158 arranged for longitudinal flow through a cylindrical filter bed 9 inches in diameter is used to remove solid particles consisting principally of iron sulfide and iron oxide having a particle size below 5 microns and principally below one micron from splitter bottoms for feed to a hydrocracking unit, the maximum flow rate that could be obtained while removing 90 percent or more by weight of the solids was approximately 20 gallons per minute. On revision of the filter to provide the radial flow as described herein with an outer electrode spaced from the casing wall, and without the liner 49, rates of 80 gallons per minute with 90 percent removal of particulate matter were obtained. It is believed that still higher rates could be obtained with effective separation of solids; however, such higher rates could not be delivered to the filter unit without upsetting associated equipment.

The higher flow rates obtained with the radial flow filter are not the result of increasing the surface area at the inlet of the filter as is described in U.S. Pat. Nos. 3,252,885 and 2,925,372. The filter bed in the electrostatic filter of the type described in U.S. Pat. No. 3,928,158 is open and offers little resistance to flow. Because of the very open structure of the filter bed in the electrostatic filter, no filter cake is formed on the entrance surface of the electrostatic filter. The solids are deposited throughout the filter bed at the points of contact of the beads. It is believed that the improved separation resulting from the radial flow pattern is caused by the reduced linear velocity of the liquid which greatly reduces the tendency of the liquid to wash from the filter solid particles deposited at the points of contact of the glass beads rather than the increased entrance surface area of the filter bed. Apparently, linear velocity of the liquid flowing through the filter has a larger effect on deposition of the solid contaminants on the glass beads than does the time the liquid is in the filter bed.

The arrangement described with reference to the drawing in which the flow pattern is from the central electrode radially outward through the filter bed is the preferred embodiment. Tests conducted with flow in the opposite direction, i.e., radially inward to the center electrode which serves also as a filtered product discharge line, indicated no appreciable difference in the efficiency of solids removal from the hot hydrocarbon liquids.

The arrangement of the hot outer electrode 44 between the grounded center electrode 34 and the grounded casing results in a voltage gradient through the permeable bed both within and outside of the outer electrode. Because of the short distance between the center electrode 34 and the outer electrode 44 and between the outer electrode and the casing, the necessary voltage gradient can be obtained with a voltage difference between the hot electrode and ground approximately half of what would be required if the center electrode were hot and there were no outer electrode.

The terms "filter bed", "filter" and "filtered product" have been used in this specification only for convenience and because of the general similarity of particulate bed 55 to some types of filter beds. It is recognized that the separation of solids from the liquid flowing through particulate bed 55 is not the conventional filtration in which solids are separated from a liquid because the openings in a filter medium, or a filter cake built up on the filter medium, are too small for the solid particles to pass through.

We claim:

1. A filter for removal of finely divided solid particles from liquids of low electrical conductivity comprising a vertical cylindrical casing, a particulate filter bed of substantially spherical, smooth-surfaced, nondeformable particles of high electrical resistivity within the casing, a central electrode extending vertically through at least a portion of the filter bed, a vertical cylindrical perforated outer electrode extending longitudinally in the filter bed concentric with the central electrode, means for applying a voltage gradient in the range of 5 to 20 kv per inch between the central electrode and outer electrode, and inlet and outlet means constructed and arranged to direct liquid to be filtered radially through the particulate bed.

2. A filter as set forth in claim 1 characterized by the filter bed resting on the lower end of the casing, a backflush inlet opening into the lower end of the casing centrally of the outer electrode, backflush outlet at the upper end of the casing, and valve means on the backflush inlet and backflush outlet for control of flow of backflush liquid through the casing.

3. A filter as set forth in claim 2 characterized by the inlet means being connected and arranged for delivery of the liquid into the central portion of the particulate filter bed and the outlet means communicating with the periphery of the particular filter bed for discharging filtered liquid that has passed through the particulate filter bed.

4. A filter as set forth in claim 3 characterized by the central electrode being tubular and perforated in the interval of the particulate filter bed and the inlet means being arranged to deliver liquid into the central electrode.

5. A filter as set forth in claim 4 characterized by the outer electrode being perforated and spaced from the wall of the casing whereby filtered liquid flows through the outer electrode and the entire filter bed being within the outer electrode.

6. A filter as set forth in claim 5 characterized by the outer electrode being at a midpoint in the filter bed between the central electrode and the wall of the casing, the lower end of the outer electrode being above the lower end of the particulate filter bed and the upper end of the outer electrode below the top of the particulate filter bed.

7. A filter as set forth in claim 1 characterized by the central electrode being grounded and the outer electrode being connected to an electrical source for applying the voltage gradient between the electrodes.

8. A filter for the separation of finely divided solid particles from a liquid of low electrical conductivity comprising a cylindrical casing, a particulate filter bed resting on the lower end of the casing comprising glass beads having a size in the range of approximately ⅛ inch to approximately ¼ inch and a depth of approximately 75 percent of the length of the casing, a tubular central perforated electrode extending from one end of the casing vertically through at least a portion of the filter bed, said central electrode being perforated over an interval within the filter bed, a perforated cylindrical outer electrode concentric with the central electrode, a perforated cylindrical liner within the casing and joined at its upper and lower ends to the casing, conductors extending through the casing and supporting the outer electrode at a midpoint between the central electrode and the liner in the filter bed with its upper end below the top of the filter bed and its lower end above the bottom of the filter bed, bushings supporting the conductors and insulating said conductors from the casing, inlet means constructed and arranged to deliver liquid to be filtered into the central electrode, an outlet through the wall of the casing between the upper and lower ends of the liner, means for grounding the central electrode, means for connecting the conductors to an electric power source for applying a voltage gradient of 5 to 20 kv per inch between the electrodes, a backflush inlet opening through the lower end of the casing, a backflush outlet at the upper end of the casing, and valve means to control flow of liquid through the filter during backflushing and filtering.

9. A method of filtering finely divided solid particles from a liquid of low electrical conductivity comprising flowing the liquid radially through a cylindrical particulate filter bed of substantially spherical, smooth-surfaced, nondeformable particles of low electrical conductivity in a vertical cylindrical casing, maintaining a voltage gradient through the filter bed of 5 to 20 kv per inch between a central electrode in the filter bed and an outer cylindrical electrode in the filter bed concentric with the central electrode, periodically interrupting the voltage gradient and radial flow of liquid to be filtered, and flowing a backflush liquid upwardly through the filter bed and out of the upper end of the casing at a rate to remove deposited solids from the filter bed while the voltage gradient is interrupted.

10. A method as set forth in claim 9 in which the liquid to be filtered is flowed through a tubular central electrode extending vertically into the filter bed perforated in the interval of the filter bed and radially outwardly through a perforated cylindrical outer electrode concentric with the central electrode grounding the central electrode, and applying a charge to the outer electrode and grounding the central electrode and the casing to maintain the voltage gradient while the liquid flows radially through the filter bed.

11. A filter as set forth in claim 4 characterized by a vertical perforated cylindrical liner within the casing between the outer electrode and the casing wall concentric with and spaced from the outer electrode a distance permitting movement of the particles in the filter bed over the outer surface of the outer electrode on backflushing and defining with the casing wall an annular passage around the particulate filter bed, said annular outlet passage being closed at its upper and lower ends, the filter bed extending outwardly to the liner, the perforations in the liner being of a size to prevent entry of the particles of the filter bed into the annular outlet passage, and the annular outlet passage being in communication with the outlet means.

12. A filter as set forth in claim 1 in which the outer electrode is between the central electrode and the casing, the outer electrode is electrically charged and the central electrode and casing are grounded whereby a voltage gradient in the range of 5 to 20 kv per inch is maintained between the central electrode and the outer electrode and between the outer electrode and the casing.

13. A filter as set forth in claim 11 characterized by the outer electrode being electrically charged and the central electrode and the liner being grounded, and the outer electrode being approximately midway between the central electrode and the liner whereby a voltage gradient of 5 to 20 kv per inch is maintained between the central electrode and the outer electrode and between the outer electrode and the liner.

14. A method as set forth in claim 10 characterized by flowing the liquid from the outer electrode outwardly through a portion of the filter bed surrounding the outer electrode and then through a perforated cylindrical liner concentric with and surrounding the outer electrode, and the liner being grounded whereby a voltage gradient of 5 to 20 kv per inch is maintained between the central electrode and the outer electrode and between the outer electrode and the liner while the liquid flows radially through the filter bed.

15. A filter for removal of finely divided solid particles from liquids of low electrical conductivity comprising a vertical cylindrical casing, a particulate filter bed of nondeformable solid particles of high electrical resistivity and a size in the range of 3 to 6 mesh within the casing, a central electrode extending vertically through at least a portion of the filter bed, a vertical cylindrical outer electrode extending longitudinally in the filter bed concentric with the central electrode at substantially the elevation of the central location, means for applying a voltage gradient in the range of 5 to 20 kv per inch between the central electrode and outer electrode, and inlet and outlet means constructed and arranged to direct liquid to be filtered radially through the particulate bed.

16. A filter for removal of finely divided solid particles from liquids of low electrical conductivity comprising a vertical cylindrical casing, a particulate filter bed of gravel having a size of approximately 3 to 6 mesh within the casing, a central electrode extending vertically through at least a portion of the filter bed, a vertical cylindrical outer electrode extending longitudinally in the filter bed concentric with the central electrode, means for applying a voltage gradient in the range of 5 to 20 kv per inch between the central electrode and outer electrode, and inlet and outlet means constructed and arranged to direct liquid to be filtered radially through the particulate bed.

17. A filter for the separation of finely divided solid particles from a liquid of low electrical conductivity comprising a vertical cylindrical casing, a particulate filter bed within the casing comprising substantially spherical, smooth-surfaced, nondeformable particles of high electrical resistivity having a size in the range of approximately 3 mesh to 6 mesh, a tubular central electrode extending vertically through at least a portion of the filter bed, said central electrode being perforated only in the interval within the filter bed, a vertical cylindrical perforated liner within the casing adjacent but spaced from the wall of the casing to provide an annular passage adjacent the wall of the casing, means closing the upper and lower ends of the annular passage, the perforations in the liner being of a size to prohibit passage of particles of the filter bed therethrough, said liner defining the outer boundary of the filter bed, a perforated cylindrical outer electrode concentric with the central electrode supported vertically at a midpoint between the central electrode and the liner with its upper end below the top of the filter bed and its lower end above the bottom of the filter bed, liquid inlet means constructed and arranged to deliver liquid to be filtered into the central electrode, an outlet through the casing communicating with the annular passage, means for grounding the central electrode, the casing and the liner, means connecting the outer electrode to an electric power source adapted to apply a voltage gradient of 5 to 20 kv per inch between the central electrode and the outer electrode and between the outer electrode and the liner, a backflush inlet constructed and arranged to deliver backflush liquid into the lower end of the filter bed, a backflush outlet at the upper end of the casing above the filter bed, and valve means to control flow of liquid through the filter during backflushing and filtering.

* * * * *

UNITED STATES PATENT AND TRADEMARK OFFICE
CERTIFICATE OF CORRECTION

PATENT NO. : 4,059,498

DATED : November 22, 1977

INVENTOR(S) : James H. Crissman, G. Ray Fritsche, Frederick B./ Hamel and Lloyd W. Hilty It is certified that error appears in the above-identified patent and that said Letters Patent are hereby corrected as shown below:

Column 3, line 19, "surfce" should be --surface--.

Column 4, line 52, "grouned" should be --grounded--.

Column 6, line 68, insert --a-- before "backflush".

Column 7, line 8, "particular" should be --particulate--.

Column 8, line 27, before "passage" insert --outlet--.

Signed and Sealed this

Eleventh Day of April 1978

[SEAL]

Attest:

RUTH C. MASON
Attesting Officer

LUTRELLE F. PARKER
Acting Commissioner of Patents and Trademarks